United States Patent
Esteyne et al.

(10) Patent No.: US 9,611,049 B2
(45) Date of Patent: Apr. 4, 2017

(54) ELECTRICAL POWER SUPPLY DEVICE FOR AIRCRAFT WITH ELECTRIC PROPULSION

(71) Applicants: EUROPEAN AERONAUTIC DEFENCE AND SPACE COMPANYEADS FRANCE, Paris (FR); AIRBUS GROUP SAS, Blagnac (FR)

(72) Inventors: Didier Esteyne, Saujon (FR); Emmanuel Joubert, Issy les Moulineaux (FR); Hichem Smaou, Paris (FR); Charles Nespoulous, Saint Cloud (FR); Bruno Rechain, Paris (FR)

(73) Assignee: AIRBUS GROUP SAS, Blagnac (FR)

(*) Notice: Subject to any disclaimer, the term of this patent is extended or adjusted under 35 U.S.C. 154(b) by 0 days.

(21) Appl. No.: 14/896,653

(22) PCT Filed: Jun. 2, 2014

(86) PCT No.: PCT/EP2014/061310
§ 371 (c)(1),
(2) Date: Dec. 7, 2015

(87) PCT Pub. No.: WO2014/195246
PCT Pub. Date: Dec. 11, 2014

(65) Prior Publication Data
US 2016/0107758 A1 Apr. 21, 2016

(30) Foreign Application Priority Data

Jun. 7, 2013 (FR) .................................. 13 55250

(51) Int. Cl.
*H02P 1/00* (2006.01)
*B64D 31/02* (2006.01)
(Continued)

(52) U.S. Cl.
CPC ............. *B64D 31/02* (2013.01); *B64D 27/24* (2013.01); *H02J 1/08* (2013.01); *H02J 7/0054* (2013.01);
(Continued)

(58) Field of Classification Search
CPC ............. B60L 11/1868; B60L 11/1864; B64D 2221/00; B60K 6/28
See application file for complete search history.

(56) References Cited

U.S. PATENT DOCUMENTS 4,605,185 A 8/1986 Reyes
2012/0025032 A1 2/2012 Hopdjanian et al.
(Continued)

FOREIGN PATENT DOCUMENTS

DE 10 2011 105880 A1 12/2012
EP 2 404 775 A2 1/2012

*Primary Examiner* — Karen Masih
(74) *Attorney, Agent, or Firm* — Im IP Law; C. Andrew Im

(57) ABSTRACT

An electrical power supply device for electric propulsion aircraft includes first and second electric motors configured to ensure the propulsion of the aircraft. First and second high-voltage electrical circuits are connected respectively to the two electric motors. A low-voltage electrical circuit is connected to at least one control and/or command facility of the aircraft. First and second pack of batteries are connected respectively to the two high-voltage electrical circuits. First and second battery management systems are connected to the low voltage circuit. Two battery management systems are linked respectively to the two packs of batteries. An electrical converter is connected to the first high-voltage electrical circuit and to the low-voltage electrical circuit.

15 Claims, 2 Drawing Sheets

(51) Int. Cl.
*B64D 27/24* (2006.01)
*H02J 1/08* (2006.01)
*H02J 7/00* (2006.01)
*H02J 4/00* (2006.01)
*H02J 1/00* (2006.01)

(52) U.S. Cl.
CPC ............ *B64D 2221/00* (2013.01); *H02J 4/00* (2013.01); *H02J 2001/008* (2013.01); *Y02T 50/62* (2013.01)

(56) References Cited

U.S. PATENT DOCUMENTS

| | | |
|---|---|---|
| 2014/0179535 A1 | 6/2014 | Stuckl et al. |
| 2014/0184142 A1* | 7/2014 | Bito .................... B60L 7/14 320/104 |

* cited by examiner

ELECTRICAL POWER SUPPLY DEVICE FOR AIRCRAFT WITH ELECTRIC PROPULSION

RELATED APPLICATIONS

This application is a §371 application from PCT/EP2014/061310 filed Jun. 2, 2014, which claims priority from French Patent Application No. 13 55250 filed Jun. 7, 2013, each of which is herein incorporated by reference in its entirety.

FIELD OF THE INVENTION

The present invention relates to an electric power supply device for an electric aircraft. The invention also relates to a starting method associated with the device and to an aircraft comprising said device.

The invention finds a particularly advantageous application in an electric aircraft capable of carrying a plurality of individuals, such as two-seat aircraft.

PRIOR ART

Combustion-engine powered aircraft contribute to global warming, to the depletion of fossil fuels and to atmospheric pollution. To alleviate these disadvantages electrically powered aircraft are a necessary development for the future of air transport.

An "electric aircraft" or "electrically powered aircraft" means an aircraft that does not use fossil fuel, such as kerosene, and which uses electrical energy to propel it. Furthermore, an electric aircraft may employ chemical reactions, notably for the operation of the storage devices, and mechanical means, notably for actuating the flight controls.

Combustion-engine powered aircraft return an efficiency of the order of 30 to 40% between the energy consumed and the mechanical energy produced to allow the aircraft to move. An electric aircraft is able to achieve efficiencies of the order of 90%. Electrical energy thus makes it possible to make flights for a lower energy cost. Electric aircraft are also more responsive.

As part of the "Green Cricri" project, a single-seat electric aircraft powered by four electric motors positioned at the front of the aircraft was developed. Each electric motor is powered by a battery pack. The aircraft also comprises aircraft command and control members connected to two battery packs the voltage level of which is lower than the four battery packs powering the electric motors. The major disadvantage with this electric power supply device is the presence of the four battery packs which are very cumbersome for the aircraft.

A two-seat electric aircraft powered by an electric motor positioned at the rear of the aircraft was developed as part of the "e-Genius" project. The electric motor is powered by four battery packs. An electric converter allows the voltage of the battery pack to be reused to power the aircraft command and control members at a lower voltage level than the level used to power the electric motor. The main disadvantage with this device is that it has just one electric motor with a propeller thereby limiting the effectiveness with which the aircraft can run along the ground.

German patent application No DE 10 2011 105 880 (EADS Deutschland GmbH) also describes an aircraft with an electric motor at the rear to provide propulsion. The electric motor is powered by a battery pack the position of which can vary along the longitudinal axis of the aircraft. Varying the position of the battery pack makes it possible to balance the aircraft in the phases of flight.

SUMMARY OF THE INVENTION

The present invention intends to overcome the disadvantages of the prior art by proposing a solution that makes it possible to limit the number of battery packs and ensure the propulsion of an electric aircraft in the event of one battery pack failing.

To this end, the present invention in its broadest sense relates to an electric power supply device for an electric aircraft, comprising:

a first and a second electric motor which are capable of propelling the aircraft, a first and a second high-voltage electric circuit which are connected respectively to the two electric motors, a low-voltage electric circuit connected to at least one command and/or control member of the aircraft, a first and a second battery pack which are connected respectively to the two high-voltage electric circuits, a first and a second battery management system which are connected to the low-voltage circuit, the battery management systems being connected respectively to the two battery packs, an electric converter connected, on the one hand, to the first high-voltage electric circuit and, on the other hand, to the low-voltage electric circuit.

The invention thus makes it possible to limit the number of battery packs by reusing the voltage of the first high-voltage electric circuit to power the low-voltage electric circuit. In addition, the device allows two electric motors that propel the aircraft to be supplied with power even if one of the battery packs is out of service.

According to one embodiment, the device comprises a backup battery connected to the first battery management system via a switch, the backup battery being able to deliver the current necessary to bring the device into operation. This embodiment allows a backup battery to be used to start the device. Furthermore, the backup battery can be used to power the essential elements of the aircraft if the converter and/or the first battery pack is out of service. The aircraft can thus fly effectively using at least one electric motor and keeping all the command and control means essential to navigation such as the radio and the landing gear or certain moving parts of the flight controls which operate using electric jacks.

According to one embodiment, the device comprises an ultra-low-voltage electric circuit connected to at least one command and/or control member of the aircraft, and an electric converter connected, on the one hand, to said low-voltage electric circuit and, on the other hand, to said ultra-low-voltage electric circuit. This embodiment allows certain command and/or control members to be powered with a voltage level lower than the voltage of the low-voltage circuit. Typically, the voltage level of the high-voltage circuit may be comprised between 200 volts and 250 volts, nominally 220 volts. The voltage level in the low-voltage circuit may be comprised between 20 volts and 30 volts, nominally 24 volts, and the voltage level of the ultra-low-voltage circuit may be comprised between 10 volts and 15 volts, nominally 12 volts.

According to one embodiment, the device comprises a charging plug connected to the two high-voltage electric circuits, the charging plug being able to recharge the two battery packs. This embodiment makes it possible to limit the bulk and mass of the charging plugs for the two battery packs.

According to one embodiment, the device comprises a first and a second voltage inverter which are able to convert a high-voltage DC voltage into a three-phase AC supply by chopping, each inverter being connected between a high-voltage electric circuit and the corresponding electric motor. This embodiment allows a battery that delivers a DC voltage to be connected to a three-phase electric motor. In addition, the three-phase AC power allows a high-power electric motor to be powered effectively.

According to one embodiment, the device comprises a first and a second motor management system which are connected between a high-voltage electric circuit and the corresponding inverter, each motor management system comprising at least one Hall-effect sensor able to provide information regarding the position of a rotor of the motor, a main switch able to cut the supply of electricity to the motor and a means of supervising the voltage applied to the motor. This embodiment allows effective control over the parameters of each electric motor, for example in the case of a brushless motor. As an alternative, the supervision means may also monitor the motor speed.

A brushless motor comprises a rotor provided with one or more permanent magnets and with at least two rotor position sensors, in this case three Hall-effect sensors. A stator of the motor is powered with three phases to induce a rotary magnetic field that drives the rotor. As the rotor turns, the position sensors send a position signal to the motor management system so that the changes in motor phase anticipate rotor position.

According to one embodiment, the motor management systems and the battery management systems comprise a backup converter connected to the second high-voltage electric circuit. This embodiment allows the sensitive elements to be powered in the event of a break in the power supply of the first high-voltage circuit or a failure of the high-voltage or low-voltage converter without using the backup battery which may have limited charge. When a break in the low-voltage circuit is detected, the backup converters come into operation automatically, the motor management systems and the battery management systems are powered only by the second high-voltage electric circuit.

According to one embodiment, at least one battery pack comprises lithium-ion batteries for a total storage capacity of between 40 and 80 Ah. This embodiment allows the battery pack to deliver a high power density (two to five times greater than nickel-metal hydride for example) without a memory effect occurring. A lithium-ion battery pack may comprise between fifty and seventy elements for a total storage capacity of between 40 and 80 Ah, and for preference, the battery pack comprises sixty elements.

A second aspect of the invention relates to an electric aircraft comprising at least two electric motors and a power supply device according to one of the preceding embodiments.

A third aspect of the invention relates to a method for starting an electric aircraft comprising the following steps:
 closing a switch to connect a backup battery to the first battery management system,
 checking the voltage of the backup battery using the battery management system and interrupting the start if the voltage of the backup battery is below a critical threshold,
 setting into operation a precharging of an inverter,
 closure of a contact switch of a battery pack,
 setting into operation of the electric converter,
 checking of the voltage of at least one battery pack using the battery management system and interrupting the start if the voltage of at least one battery pack is below a critical threshold, and
 opening of the switch to disconnect the backup battery.

BRIEF DESCRIPTION OF THE DRAWINGS

The invention will be better understood with the aid of the description, given hereinafter purely by way of explanation, of some embodiments of the invention given with reference to the figures in which.

DETAILED DESCRIPTION OF THE EMBODIMENTS OF THE INVENTION

Figure 1:
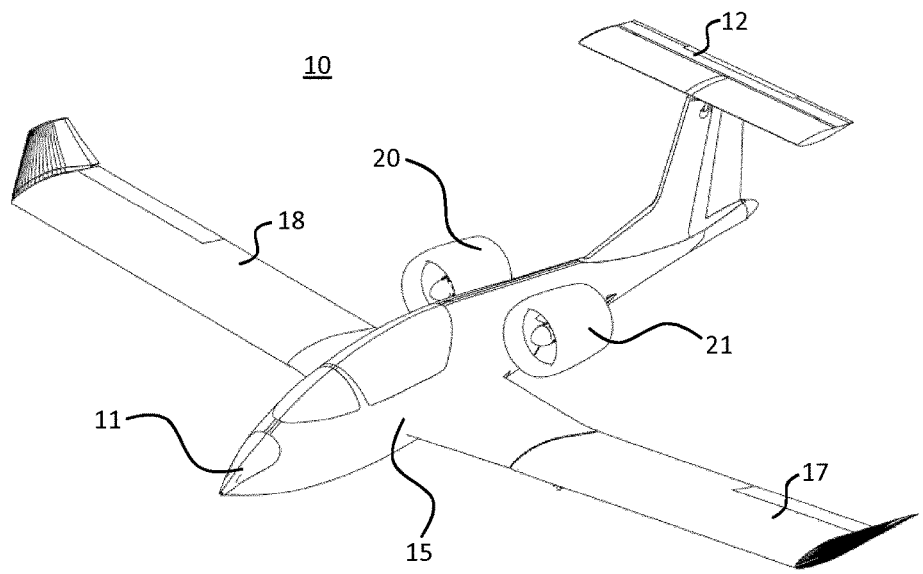
FIG. 1 illustrates an electric aircraft comprising a device according to the present invention.

FIG. 1 illustrates an electric aircraft 10 comprising a nose 11 positioned at the front of the craft and a tail 12 positioned at the rear of the craft, the nose 11 and the tail 12 being connected by a fuselage 15. Two wings 17-18 extend on the sides of the craft to provide the aircraft 10 with lift in the air.

Figure 2:
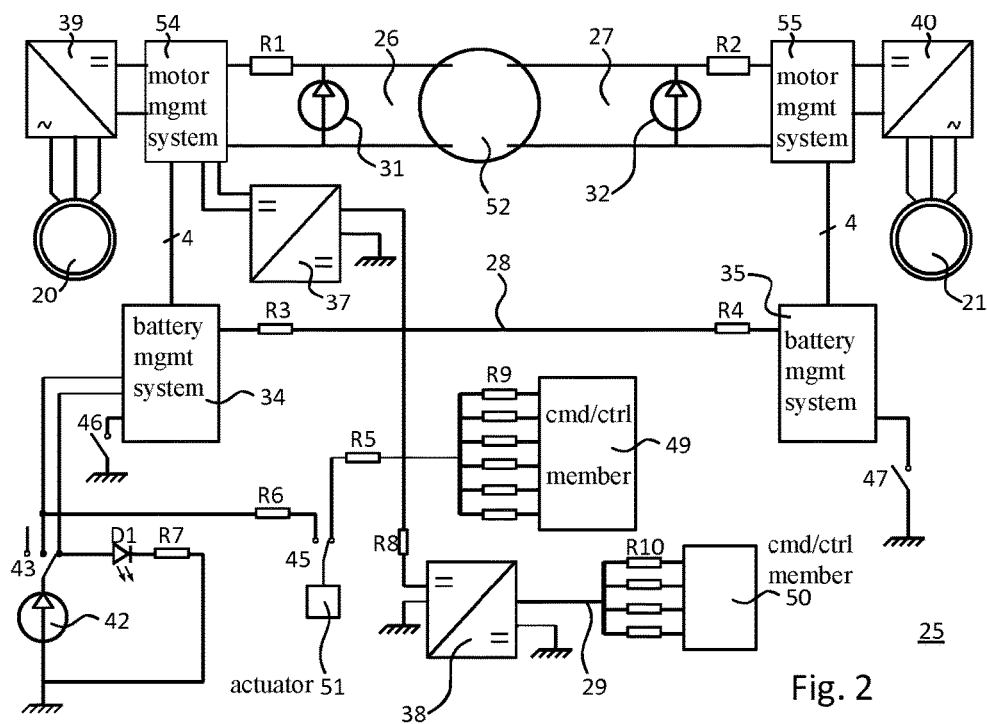
FIG. 2 illustrates an electric power supply device according to a first embodiment of the invention in which the power supply device comprises two electric motors.
Figure 3:
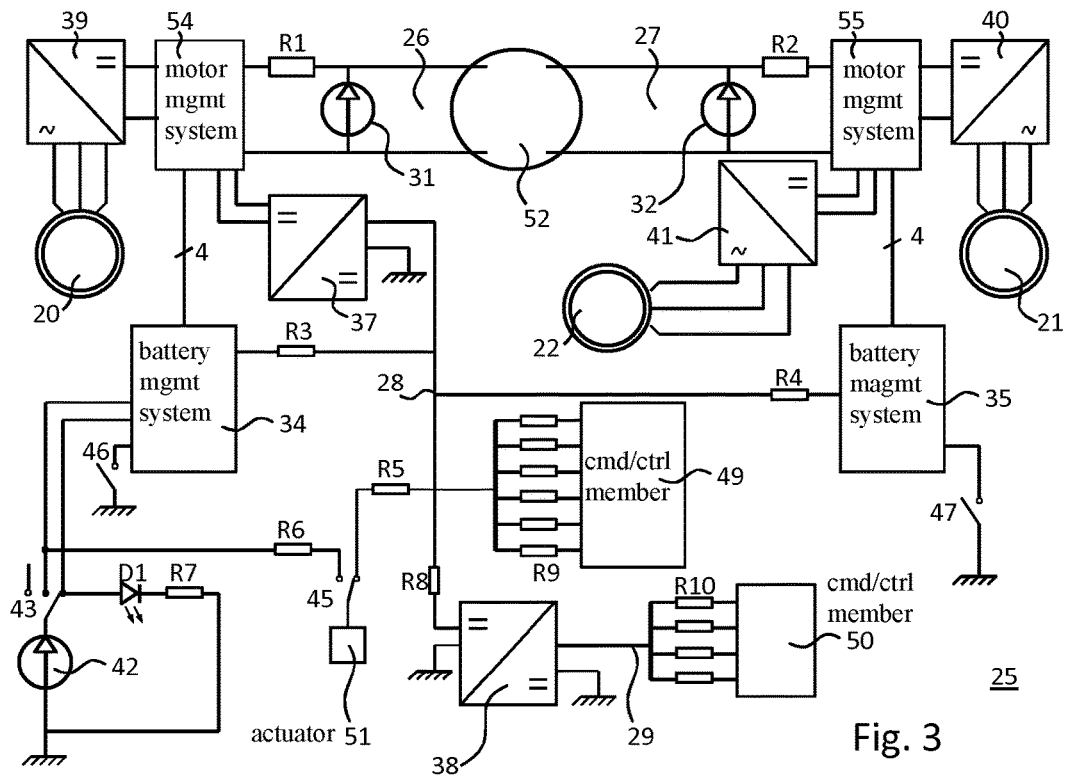
FIG. 3 illustrates an electric power supply device according to a second embodiment of the invention in which the power supply device comprises three electric motors.
Figure 4:
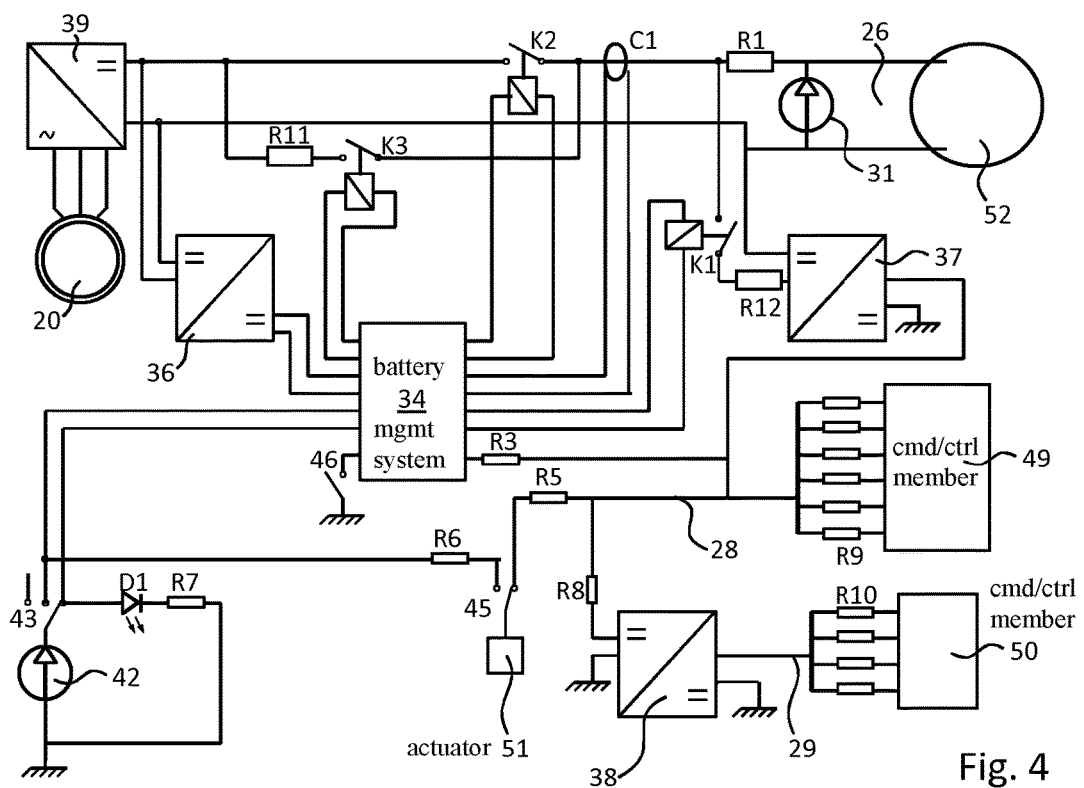
FIG. 4 illustrates part of an electric power supply device according to a third embodiment of the invention.

The aircraft 10 also comprises two electric motors 20-21, the electric power supply device 25 for which is depicted schematically in FIGS. 2 to 4. The shape and size of the aircraft can vary without changing the invention.

FIG. 2 illustrates an electric power supply device 25 comprising two electric motors 20 and 21, each one connected to a high-voltage electric circuit 26, 27 powered by a battery pack 31, 32. For that, each battery pack 31, 32 is in series with a fuse R1, R2, a motor management system 54, 55 and an inverter 39, 40.

In the embodiment of FIG. 3, the device 25 comprises three electric motors 20, 21, 22. The third electric motor 22 is connected to the second motor management system 55 via an inverter 41. As an alternative, the device may comprise as many electric motors as required to propel the aircraft 10.

The fuse R1, R2 has the effect of protecting the battery pack 31, 32 from overvoltages. The device may also comprise preloading resistors, not depicted, to prevent sparking when the high-voltage circuit is switched on.

The inverter 39, 40 allows a high-voltage DC voltage to be converted to three-phase AC power capable of powering the windings of the stator of the electric motor 20, 21. For preference, the inverter 39, 40 has a conversion frequency of between 15 kHz and 20 kHz. The motor management system 54, 55 comprises at least two Hall-effect sensors able to provide information regarding the position of the stator of the electric motor 20, 21, a main switch able to cut the supply of electrical power to the electric motor 20, 21 and a means of supervising the voltage applied to the electric motor 20, 21. The Hall-effect sensors make it possible to anticipate demands for torque and speed of the electric motor 20, 21 according to the measured position thereof. The supervision means makes it possible to measure any phase lag there might be at the inverter 39, 40.

The two battery packs 31, 32 can be recharged simultaneously by a charging plug 52 connected to the two battery packs 31, 32. For preference, each battery pack 31, 32 comprises several lithium-ion batteries for a total capacity of between 40 and 80 Ah, preferably 40 Ah. A battery pack 31, 32 may contain between fifty and seventy elements and preferably comprises sixty elements.

A battery management system 34, 35 monitors the elements of each battery pack 31, 32. The battery management system 34, 35 analyzes the temperature and voltage and controls the charge of each element of the associated battery pack 31, 32 using sensors positioned on each element of each battery pack 31, 32. Furthermore, each battery management system 34, 35 communicates with the associated motor management system 54, 55 by means of a databus, for example by means of a CAN (Controller Area Network) protocol.

The battery management systems 34, 35 comprise an input that may be grounded by a switch 46, 47 in order to trigger the starting of the battery management system 34, 35. Furthermore, the battery management systems 34, 35 are powered by a low-voltage electric circuit 28 via a resistor R3, R4.

The low-voltage electric circuit 28 is powered by a converter 37 connected to the first high-voltage electric circuit 26. The high-voltage electric circuit 26 has a DC voltage of between 200 and 250 volts, preferably 220 volts. The low-voltage electric circuit 28 has a DC voltage of between 20 and 30 volts, preferably 24 volts. The low-voltage electric circuit 28 powers at least one command and/or control member 49 of the aircraft via a resistor R9 for each member 49. The command and/or control members 49 may be telemetry tools, telecommunications means or the like.

The low-voltage electric circuit 28 is also connected to a converter 38 via a resistor R8. The converter 38 powers an ultra-low-voltage electric circuit 29 having a DC voltage of between 10 and 15 volts, preferably 12 volts. The ultra-low-voltage electric circuit 29 also powers at least one command and/or control member 50 of the aircraft via a resistor R10 for each member 50. The command and/or control members 50 may be flight indicators, aircraft position actuators, radio or the like.

Other actuators 51 may be powered by the low-voltage electric circuit 28 via a resistor R5 when the switch 45 is in a first position. These actuators 51 may allow the deployment of wheels or tackle. When the switch 45 is in a second position, these actuators 51 can be powered by a backup battery 42 when the switch 43 is in the second position. The first and second positions of the switch 43 are connected to two separate inputs of the first battery management system 34. The first position of the switch 43 is also connected to a light-emitting diode D1 in series with a resistor R7. A third position of the switch 43 allows the backup battery 42 to be completely disconnected. This backup battery is able to provide a low-voltage DC voltage to power the first battery management system 43 and start the device 25.

During the phase of starting the aircraft 10, the first step is to place the switch 43 in the first position so as to connect the backup battery 42 to the first battery management system 34. The battery management system 34 then checks the voltage of the backup battery and interrupts the start if the voltage of the backup battery 42 is below a critical threshold. If not, the battery management system 34 sets the electric converter 37 in operation. The battery management system 34 then checks the voltage of at least one battery pack 31, 32 and interrupts the start if the voltage of at least one battery pack 31, 32 is below a critical threshold. If not, the battery management system 34 places the switch 43 in the third position and sets at least one electric motor 20, 21 in operation.

As an alternative, each sensitive element of the aircraft such as the motor management systems 54, 55 and the battery management systems 34, 35 comprises a backup converter connected to the second high-voltage electric circuit 27.

FIG. 4 shows one embodiment of the invention for which the device 25 is depicted only in part. The device 25 does not comprise a motor management system 54. However, the first battery management system 34 controls three contact switches K1-K3 and a sensor C1.

The first contact switch K1 allows the converter 37 to be connected to the high-voltage circuit 26. This contact switch is open upon start up of the device 25 and the battery management system 34 causes it to close for normal aircraft operation. The contact switches K2 and K3 may alternately be used to use the resistor R11 and alter the output of the battery pack 31. The sensor C1 provides the battery management system 34 with information regarding the voltage or current of the battery pack 31.

FIG. 4 also shows that the battery management system 34 can be powered directly on the high-voltage circuit 26 using a converter 36 that delivers a low-voltage voltage equivalent to the voltage of the low-voltage circuit 28.

The invention thus allows an electric aircraft 10 to be powered while limiting the number of battery packs 31, 32 and using a backup battery 42 able to start or restart the device 25 in the event of a problem with an element of the device 25.

The invention can be transferred to an electric aircraft comprising more than two motors by the ad-hoc addition of battery packs with control circuits.

The invention claimed is:

1. An electric power supply device for an electric aircraft, comprising:
   first and second electric motor configured to propel the electric aircraft;
   first and second high-voltage electric circuits connected respectively to the first and second electric motors;
   a low-voltage electric circuit connected to at least one of a command member and a control member of the electric aircraft;
   first and second battery packs connected respectively to the first and second high-voltage electric circuits;
   first and second battery management systems connected to the low-voltage circuit, the first and second battery management systems connected respectively to the first and second battery packs; and
   a first electric converter connected to the first high-voltage electric circuit and to the low-voltage electric circuit.

2. The electric power supply device as claimed in claim 1, further comprising a backup battery connected to the first battery management system via a switch, the backup battery is configured to deliver a current sufficient to bring the electric power supply device into operation.

3. The electric power supply device as claimed in claim 1, further comprising:
   an ultra-low-voltage electric circuit connected to said at least one of a command member and a control member of the aircraft; and
   a second electric converter connected to the low-voltage electric circuit and to the ultra-low-voltage electric circuit.

4. The electric power supply device as claimed in claim 3, wherein a voltage level of the ultra-low-voltage electric circuit is between 10-15 volts.

5. The electric power supply device as claimed in claim 1, wherein a voltage level of the low-voltage electric circuit is between 20-30 volts.

6. The electric power supply device as claimed in claim 1, wherein a voltage level of the first and second high-voltage electric circuit is between 200-250 volts.

7. The electric power supply device as claimed in claim 1, further comprising a charging plug connected to the first and second high-voltage electric circuits, the charging plug configured to recharge the first and second battery packs.

8. The electric power supply device as claimed in claim 1, further comprising first and second voltage inverters configured to convert a high-voltage DC voltage into a three-phase AC supply by chopping, each voltage inverter is connected between a high-voltage electric circuit and its respective electric motor.

9. The electric power device as claimed in claim 8, wherein a conversion frequency of the first and second voltage inverters is between 15 kHz and 20 kHz.

10. The electric power device as claimed in claim 8, wherein the first and second voltage converters are configured to power respectively windings of the first and second electric motors.

11. The electric power device as claimed in claim 8, further comprising first and second motor management systems, each motor management system is connected between a high-voltage electric circuit and its respective voltage inverter, and each motor management system comprises at least one Hall-effect sensor configured to provide information regarding a position of its respective electric motor, a main switch configured to disable electricity supplied to the respective electric motor, and a controller to supervise a voltage applied to the respective electric motor.

12. The electric power device as claimed in claim 11, wherein each motor management system and each battery management system comprises a backup converter connected to the second high-voltage electric circuit.

13. The electric power supply device as claimed in claim 1, wherein at least one battery pack comprises lithium-ion batteries having a total storage capacity of between 40 and 80 Ah.

14. An electric aircraft comprising at least two electric motors and an electric power supply device as claimed in claim 1.

15. A method of starting an electric aircraft comprising an electric power supply device, comprising the steps of:
wherein the electric power device comprises: first and second electric motor configured to propel the electric aircraft, first and second high-voltage electric circuits connected respectively to the first and second electric motors; a low-voltage electric circuit connected to at least one of a command member and a control member of the electric aircraft; first and second battery packs connected respectively to the first and second high-voltage electric circuits; first and second battery management systems connected to the low-voltage circuit, the first and second battery management systems connected respectively to the first and second battery packs; a first electric converter connected to the first high-voltage electric circuit and to the low-voltage electric circuit; and a backup battery connected to the first battery management system via a switch, the backup battery is configured to deliver a current sufficient to bring the electric power supply device into operation;
closing the switch to connect the backup battery to the first battery management system;
checking a voltage of the backup battery utilizing the first battery management system and interrupting a start of the electric aircraft in response to a determination that the voltage of the backup battery is below a critical threshold;
pre-charging of first and second voltage inverters, each voltage converter is configured to convert a high-voltage DC voltage into a three-phase AC supply by chopping, and each voltage inverter is connected between a high-voltage electric circuit and its respective electric motor;
closing of a contact switch of each battery pack;
initiating an operation of the electric converter;
checking a voltage of at least one battery pack using a corresponding battery management system and interrupting the start of the electric aircraft in response to a determination that the voltage of said at least one battery pack is below the critical threshold; and
opening the switch to disconnect the backup battery.

* * * * *